(12) United States Patent
Nakagaki et al.

(10) Patent No.: US 6,324,482 B1
(45) Date of Patent: Nov. 27, 2001

(54) SENSOR PROVIDED WITH ADJUSTING FUNCTION

(75) Inventors: Toshiya Nakagaki, Wakayama; Toshiyuki Nozoe, Kyoto; Takahiro Manabe, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/254,691

(22) PCT Filed: Jul. 14, 1998

(86) PCT No.: PCT/JP98/03144

§ 371 Date: Apr. 8, 1999

§ 102(e) Date: Apr. 8, 1999

(87) PCT Pub. No.: WO99/04226

PCT Pub. Date: Jan. 28, 1999

(30) Foreign Application Priority Data

Jul. 14, 1997 (JP) .................................................. 9-188082
Jul. 22, 1997 (JP) .................................................. 9-195371

(51) Int. Cl.$^7$ .................................................. G01C 19/00
(52) U.S. Cl. .................. 702/104; 702/85; 702/91; 702/99; 702/104; 702/107; 702/130; 702/133; 702/134; 702/136; 702/183; 702/189; 702/190; 702/FOR 103; 702/FOR 104; 702/FOR 134; 702/FOR 135; 702/FOR 142; 702/FOR 156; 702/FOR 157; 702/FOR 158; 702/FOR 159; 702/FOR 160; 702/FOR 161; 702/FOR 162; 702/FOR 163; 702/FOR 170

(58) Field of Search .................................. 702/85, 91, 99, 702/104, 107, 130, 133, 134, 136, 183, 189, 190, FOR 103, FOR 104, FOR 134, FOR 135, FOR 142, FOR 156, FOR 157, FOR 158, FOR 159, FOR 160, FOR 161, FOR 162, FOR 163, FOR 170

(56) References Cited

U.S. PATENT DOCUMENTS

| | | | |
|---|---|---|---|
| 5,062,065 | * 10/1991 | Lampe | 364/571.04 |
| 5,161,311 | * 11/1992 | Esmer et al. | 33/356 |
| 5,848,383 | * 12/1998 | Yunus | 702/104 |
| 5,939,630 | * 8/1999 | Nozoe et al. | 73/504.16 |
| 6,198,275 | * 3/2001 | Wolf et al. | 324/207.12 |

FOREIGN PATENT DOCUMENTS 62-218813 9/1987 (JP).
5-45520 6/1993 (JP).

* cited by examiner

Primary Examiner—Arthur T. Grimley
(74) Attorney, Agent, or Firm—Ratner & Prestia, P.C.

(57) ABSTRACT

An object of the present invention is to provide an automatic compensation sensor that can eliminate an exclusive input terminal for the compensation mode signal. To achieve this object, the present invention comprises a sensor body (1), a signal output terminal (5) for outputting signals from the sensor body (1), and a controller for compensating the output signal from this signal output terminal (5).

9 Claims, 17 Drawing Sheets

SENSOR PROVIDED WITH ADJUSTING FUNCTION

This application is a U.S. National Phase application of PCT International application PCT/JP98/03144.

FIELD OF THE INVENTION

The present invention relates to the field of automatic compensation sensors.

BACKGROUND OF THE INVENTION

FIG. 17 shows the structure of a conventional automatic compensation sensor, in which reference numeral 1 is a sensor body. Reference numeral 2 is a microcomputer including an analog compensation signal output circuit, analog signal input circuit, memory circuit, and its peripheral circuits. Components such as a temperature sensor when the purpose of the automatic compensation sensor is to compensate for temperature are also included in reference numeral 2. Hereafter, reference numeral 2 including peripheral circuits is called a microcomputer 2. Reference numeral 3 is a signal adder to which the output of the sensor body 1 and the output of the microcomputer 2 are connected. Reference numeral 4 is a signal output circuit comprising an amplifier. Reference numeral 5 is a signal output terminal. The output signal of the signal adder 3 is connected to the analog input terminal 21 of the microcomputer 2. Reference numeral 6 is a compensation mode signal input terminal, and is connected to a digital input terminal 22 of the microcomputer 2. During compensation, an external signal source is connected to this compensation mode signal input terminal 6.

Operation of the above automatic compensation sensor is described below. The microcomputer 2 has two modes: a compensation mode and a normal operation mode. The compensation mode is activated when a compensation signal is input from the compensation mode signal input terminal 6. In other cases, the automatic compensation sensor operates in the normal operation mode.

One example of the compensation signal is a determination by high and low logic levels. The compensation mode signal input terminal 6 is pulled up inside the automatic compensation sensor by a resistance. If the compensation mode signal input terminal 6 is normally at "high" level when the compensation mode signal input terminal 6 is open, the microcomputer 2 is able to recognize the compensation mode by applying "low" voltage to the compensation mode signal input terminal 6. Accordingly, the microcomputer 2 is capable of determining the compensation mode by checking the voltage level of the digital input terminal 22.

Here, it is necessary to take appropriate measures to make it impossible to apply low voltage after compensation is completed, to prevent the compensation mode signal input terminal 6 from being erroneously set to the compensation mode.

Furthermore, if there is a possibility that the compensation mode signal input terminal 6 may be accidentally set to "low" by noise, the possibility of erroneous setting to the compensation mode may be reduced by configuring the compensation signal using serial communications.

This automatic compensation sensor requires an exclusive input terminal for the compensation mode signal used for sending compensation signals during manufacturing processes. This needs to be appropriately processed on completion of the automatic compensation sensor to prevent erroneous compensation operation of the sensor. If compensation can be tested during assembly, it may be relatively easy to modify the exclusive input terminal for the compensation mode signal. However, in case of angular velocity sensors, for example, correct output characteristics may not be obtained during assembly, requiring the adjustment of a finished product identical to those to be shipped. There are many such types of automatic compensation sensors. In this case, modifying the exclusive input terminal for the compensation mode signal becomes extremely difficult, complicating the terminal and case structure of the automatic compensation sensor and thus increasing the cost.

SUMMARY OF THE INVENTION

An object of the present invention is to provide an automatic compensation sensor which enables the elimination of an exclusive input terminal for the compensation mode signal.

To achieve this object, the present invention comprises a sensor body, a signal output terminal which outputs the signal from the sensor body, and a controller for compensating the output signal from the signal output terminal.

With the above configuration, it is possible to realize an automatic compensation sensor without requiring an exclusive input terminal for the compensation mode signal.

DESCRIPTION OF THE PREFERRED EMBODIMENT

First Exemplary Embodiment

Figure 1:
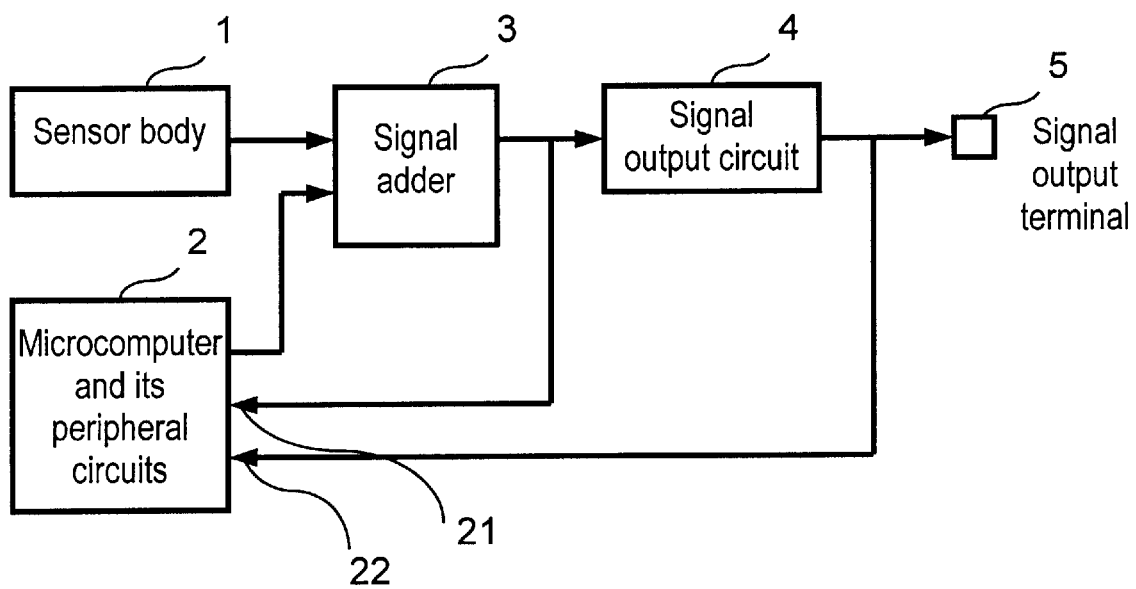
FIG. 1 is a block diagram of an automatic compensation sensor in accordance with a first exemplary embodiment of the present invention.

A first exemplary embodiment of the present invention is explained with reference to FIGS. 1 and 2. FIG. 1 shows an automatic compensation sensor in the first exemplary embodiment of the present invention. In FIG. 1, reference numeral 1 is a sensor body, and reference numeral 2 is a microcomputer including an analog compensation signal output circuit, analog signal input. circuit, and memory circuit, and its peripheral circuits. In addition, other components such as a temperature sensor when the purpose of the automatic compensation sensor is to compensate for temperature are included in reference numeral 2. Hereafter the reference numeral 2 including peripheral circuits is referred to as a microcomputer 2. Reference numeral 3 is a signal adder to which the output of the sensor body 1 and the output of the microcomputer 2 are connected. Reference numeral 4 is a signal output circuit comprising an amplifier with output resistance. Reference numeral 5 is a signal output terminal. The output signal of the signal adder 3 is connected to the analog input terminal 21 of the microcomputer 2, and the output of the signal output circuit 4 is connected to a digital input terminal 22. During compensation, an external signal source for sending the compensation mode signal is connected to the signal output terminal 5.

The operation of this automatic compensation sensor is explained next. During compensation, the external signal source sends a predetermined compensation signal through the signal output terminal 5. This signal needs to be sufficiently complicated in comparison with the signal which the sensor is intrinsically capable of outputting. Since the signal output terminal 5 is originally an output terminal, its output impedance is relatively low. The external signal source connected to the signal output terminal 5 may need to be capable of driving the output resistance included in the signal output circuit 4 as a load resistance. This enables the microcomputer 2 to receive an external signal through the digital input terminal 22 by reading it at the output section of the signal output circuit 4. Here, the digital input terminal 22 of the microcomputer 2 can receive an external signal without being affected by any kind of signal output from the signal output circuit 4.

In this exemplary embodiment, the compensation signal comprises the n numbers of 8-bit data with a start bit and stop bit. In other words, the compensation signal comprises n-byte data, which is sent via asynchronous serial communications. The transmission speed is preferably made slow as permissible by other restrictions such as start time, to avoid any influence of noise.

The microcomputer 2 executes serial signal receiving procedures for receiving the above compensation signal. One example is explained next.

The microcomputer 2 checks the value of the digital input terminal 22 every t1 seconds. Here, t1 is a value satisfying t1<1/10v when v is the transmission speed.

Receiving of 1-byte data starts after detection of the start bit.

First, the microcomputer 2 waits for t2 seconds, and then reads the first bit. Here, t2=1.5/v. Then, 7 bits are read at every t3 seconds to determine the 1-byte data. Here, t3=1/v. Then, the microcomputer 2 further waits for t3 seconds to check whether the stop bit is correct. If the stop bit is incorrect, the microcomputer 2 judges that the data is illegal.

To prevent erroneous compensation during normal operation after completing compensation, it is effective to make the microcomputer 2 sample the digital input terminal 22 only for a certain period after turning on the power.

Figure 2:
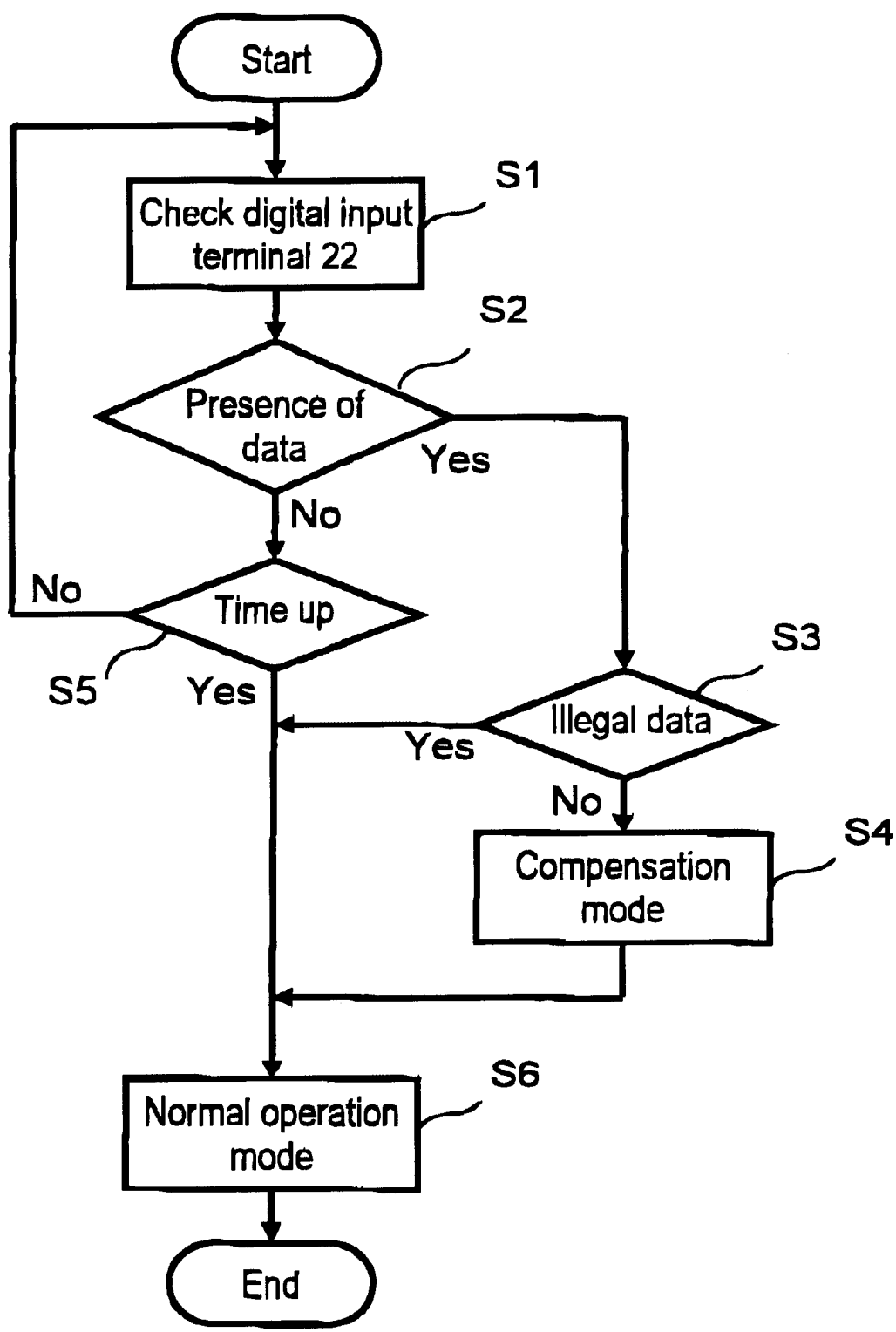
FIG. 2 is a flow chart of the operation of the sensor.

FIG. 2 is a flow chart illustrating the above operation. The microcomputer 2 checks the digital input terminal 22 during step S1. Then, the microcomputer 2 determines the presence of the compensation signal during step S2. If the compensation signal is properly received, the presence of illegal data is checked during step S3. If there is no illegal data, the microcomputer 2 executes the compensation mode in step S4. For example, if the purpose of the sensor is to compensate for temperature, the operating temperature range of the automatic compensation sensor is traced in a constant temperature chamber, for example, to measure the output of the sensor body 1 at each temperature. A value just sufficient for compensating the output of the sensor body 1 is output to the signal adder 3, and this value is stored. Here, the output of the signal adder 3 is fed back to the analog input terminal 21 of the microcomputer 2 to increase the accuracy of the compensation level by confirming the compensation result. If the sensor body 1 has temperature hysteresis, the operating temperature range is traced back and forth to determine the compensation level for that temperature by calculating a mean value for the compensation during temperature rise and temperature decrease. This improves the compensation accuracy.

The microcomputer 2 then determines the presence of a compensation signal within a specified time in step S5. If no compensation signal is received, or if an illegal signal is received during step S3, it returns to the normal operation mode during step S6. This enables the reduction of the probability of erroneous operation of the compensation mode in commercial versions of this product. In the normal operation mode, in case of the above temperature compensation, the current temperature is measured, and a compensation value corresponding to that temperature is read so as to compensate for any output error of the sensor body due to temperature changes by outputting the compensation value to the signal adder.

Second Exemplary Embodiment

Figure 3:
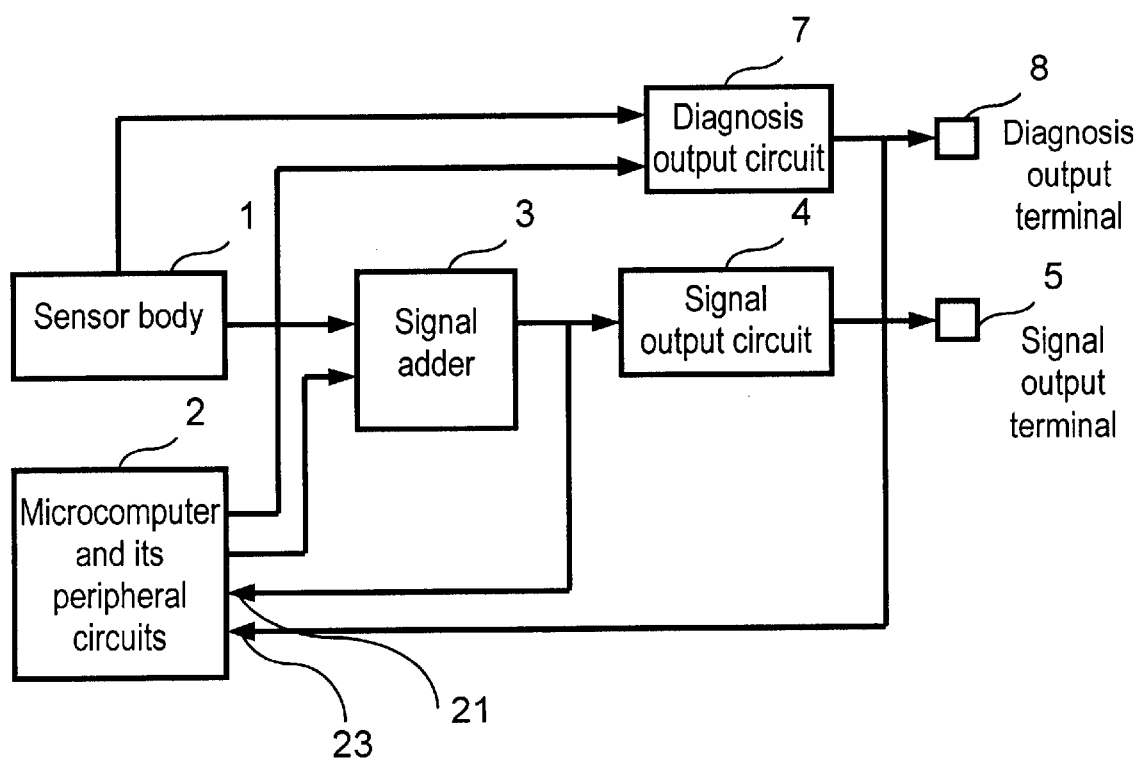
FIG. 3 is a block diagram of an automatic compensation sensor in accordance with a second exemplary embodiment of the present invention.

FIG. 3 shows an automatic compensation sensor in a second exemplary embodiment of the present invention. In FIG. 3, the sensor body 1, microcomputer and its peripheral circuit 2, signal adder 3, signal output circuit 4, and signal output terminal 5 have the same configuration as those of the automatic compensation sensor in the first exemplary embodiment. However, the output resistance is not necessarily required in the signal output circuit 4. In addition, an output terminal of a diagnosis output circuit, described later, is connected to the digital input terminal 23 of the microcomputer 2. Reference numeral 7 is the diagnosis output circuit, and signals from each diagnosis signal terminal of the sensor body 1 and microcomputer 2 are input to the diagnosis output circuit 7. Reference numeral 8 is a diagnosis output terminal which is connected to the output of the diagnosis output circuit. During compensation, an external signal source for sending the compensation mode signal is connected to the diagnosis output terminal 8.

The operation of this automatic compensation sensor is explained next. During compensation, the external signal source sends a predetermined compensation signal through the diagnosis output terminal 8. This signal needs to be sufficiently complicated in comparison with the signal which the sensor is intrinsically capable of outputting. Since the diagnosis output terminal 8 is originally an output terminal, its output impedance is relatively low. The external signal source connected may need to be capable of driving the output resistance included in the diagnosis output circuit 7 as a load resistance. This enables the microcomputer 2 to receive an external signal at the output section of the diagnosis output circuit 7 by reading it through the digital input terminal 23. Here, the digital input terminal 23 of the microcomputer 2 can receive the external signal without being affected by any kind of signal output from the diagnosis output circuit 7.

The compensation signal used here is the same as that described in the automatic compensation sensor in the first exemplary embodiment. The microcomputer 2 has the compensation mode and normal operation mode which operate in the same way as in the first exemplary embodiment.

In general, the diagnosis output is not needed to be operated in the compensation mode. Accordingly, external signal can be sent to the microcomputer 2 throughout the compensation mode.

Third Exemplary Embodiment

Figure 4:
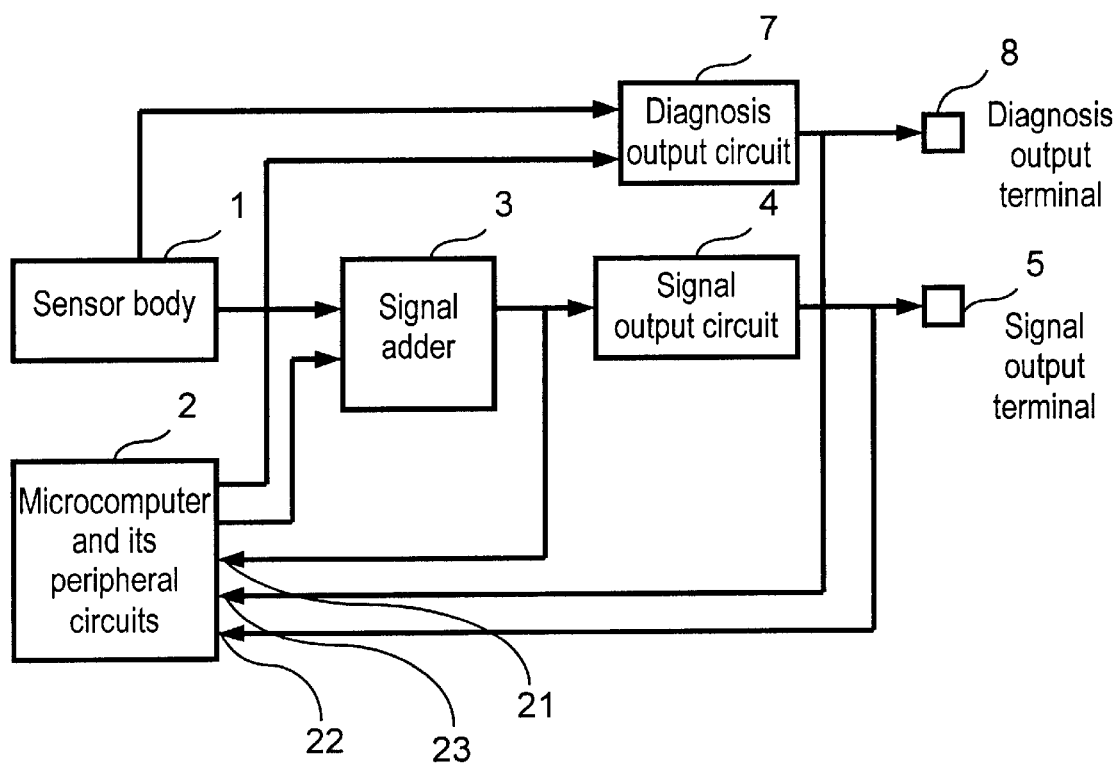
FIG. 4 is a block diagram of an automatic compensation sensor in accordance with a third exemplary embodiment of the present invention.

FIG. 4 shows an automatic compensation sensor in a third exemplary embodiment of the present invention. In FIG. 4, the sensor body 1, microcomputer and its peripheral circuit 2, signal adder 3, signal output circuit 4, signal output terminal 5, diagnosis output circuit 7, and diagnosis output terminal 8 have the same configuration as those of the automatic compensation sensor in the second exemplary embodiment. However, the microcomputer 2 has two digital input terminals 22 and 23. The terminal 22 is connected to the output of the signal output circuit 4, and the terminal 23 is connected to the output of the diagnosis output circuit 7. During compensation, an external signal source for sending the compensation mode signal is respectively connected to the signal output terminal 5 and diagnosis output terminal 8.

The operation of this automatic compensation sensor is explained next. During compensation, one external signal source sends a predetermined compensation signal through the signal output terminal 5, and another external signal source sends a predetermined compensation signal through the diagnosis output terminal 8. Each of these signals needs to be sufficiently complicated in comparison with the signal which the sensor is intrinsically capable of outputting. Since the signal output terminal 5 and diagnosis output terminal 8 are originally output terminals, their output impedance is relatively low. The external signal source respectively connected may need to be capable of driving the output resistance included in the signal output circuit 4 and diagnosis output circuit 7 as a load resistance. This enables the microcomputer 2 to receive an external signal by reading it through the digital input terminal 22 at the output section of the signal output circuit 4 and the digital input terminal 23 at the output section of the diagnosis output circuit 7. Here, the digital input terminals 22 and 23 of the microcomputer 2 can receive the external signal without being affected by any kind of signal output from the signal output circuit 4 and diagnosis output circuit 7.

The compensation signal used is the same as that described in the automatic compensation sensor in the first exemplary embodiment. The microcomputer 2 has the compensation mode and normal operation mode which operate in the same way as in the first exemplary embodiment.

With the configuration of the third exemplary embodiment, two external signals can be sent. Accordingly the third exemplary embodiment of the present invention is further effective in reducing probability of erroneous operation compared to the first and second exemplary embodiments.

Fourth Exemplary Embodiment

Figure 5:
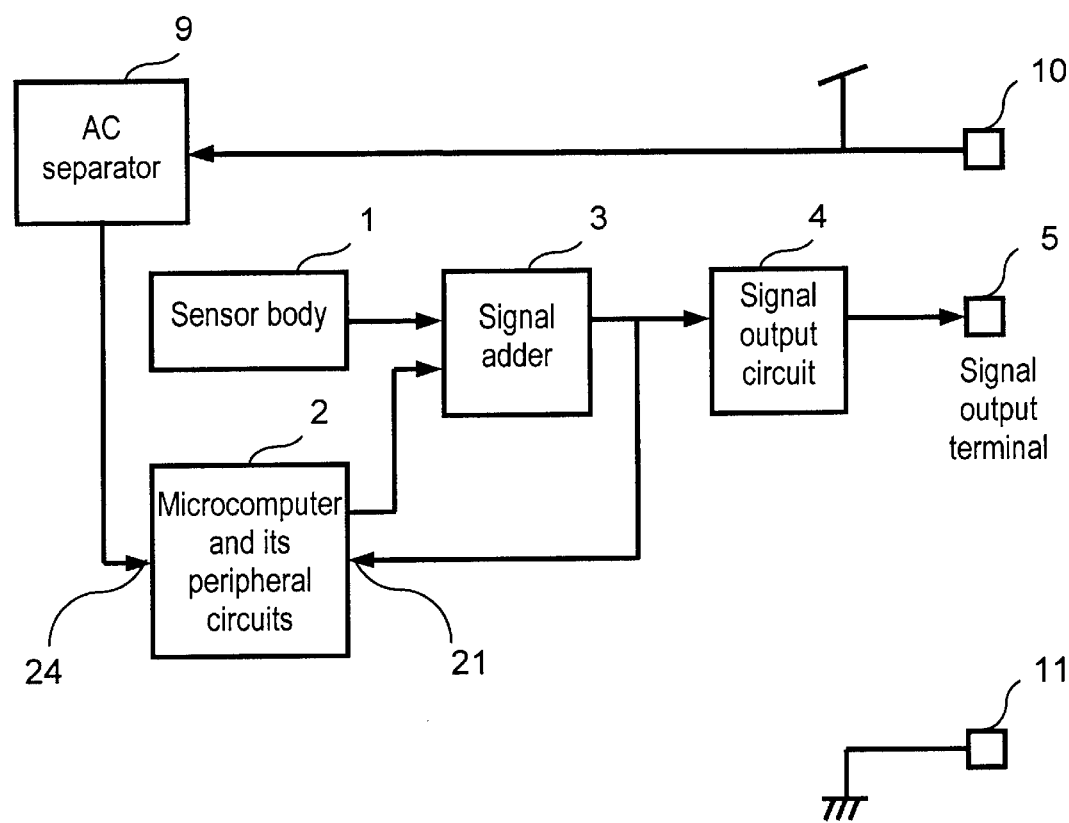
FIG. 5 is a block diagram of an automatic compensation sensor in accordance with a fourth exemplary embodiment of the present invention.

FIG. 5 shows an automatic compensation sensor in a fourth exemplary embodiment of the present invention. In FIG. 5, reference numeral 1 is a sensor body, and reference numeral 2 is a microcomputer and its peripheral circuits which have the function to control signals of the sensor body 1. Reference numeral 9 is an AC component separator (indicated as an AC separator in FIG. 5). This is inserted into the power line, and outputs AC components signed as high or low digital signals through a circuit such as Schmitt trigger circuit. The AC component separator is connected to the digital input terminal 24 of the microcomputer 2. Reference numeral 10 is a power terminal, and reference numeral 11 is a ground terminal for the power terminal 10. During compensation, power is connected to the power terminal 10, and an external signal source for sending the compensation mode signal is connected to the power line through the AC component mixer.

Next, operation of the above automatic compensation sensor is explained. During compensation, the external signal source sends a predetermined compensation signal through the power terminal 19. This signal needs to be sufficiently complicated in comparison with power supply variation. Signals sent from the external signal source are input to the AC component separator 9 through the power line, and its output is input to the digital input terminal 24 of the microcomputer 2. This enables the microcomputer 2 to receive an external signal by reading the digital input terminal 24. The compensation signal used here is the same as that described in the automatic compensation sensor in the first exemplary embodiment. However, if noise is applied to the power line when sending the compensation signal, the compensation signal may not be received properly. Accordingly, it is preferable to execute the compensation mode only when a correct signal is received in least two out of three transmissions, for example, as in the automatic compensation sensor in the first exemplary embodiment. Furthermore, the microcomputer 2 has a compensation mode and a normal operation mode, and these modes are operated in the same way as described in the first exemplary embodiment.

As explained in the first to fourth exemplary embodiments, the exclusive input terminal for the compensation mode signal can be eliminated by sending the compensation mode signal using the signal output terminal to the digital input terminal of the microcomputer. Thus the advantage of a simplified terminal structure is achieved. This reduces cost and improves reliability because the present invention eliminates the need for making the exclusive input terminal for the compensation mode signal unusable after adjustment.

Fifth Exemplary Embodiment

Figure 6:
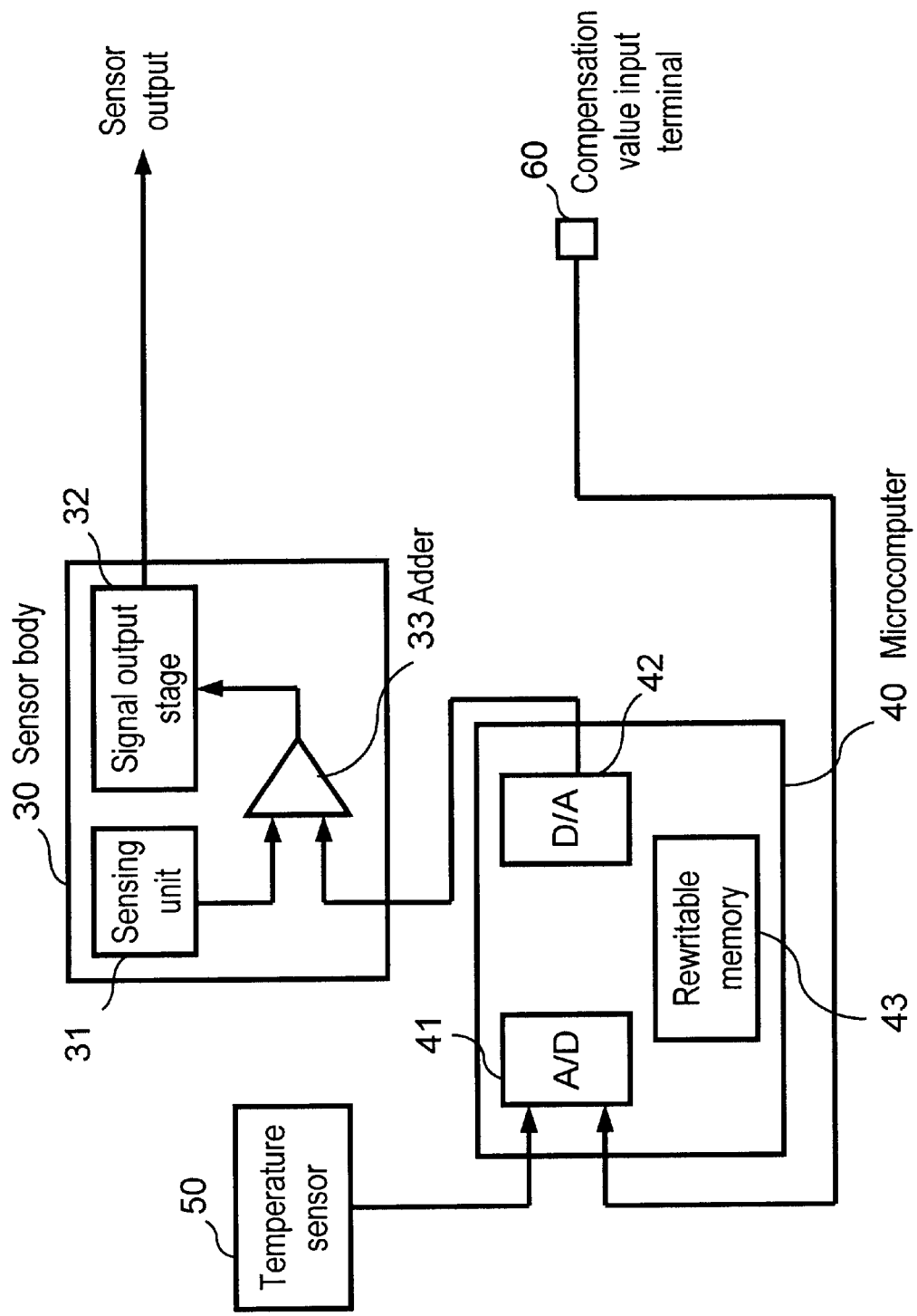
FIG. 6 is a block diagram of an automatic compensation sensor in accordance with a fifth exemplary embodiment of the present invention.
Figure 7:
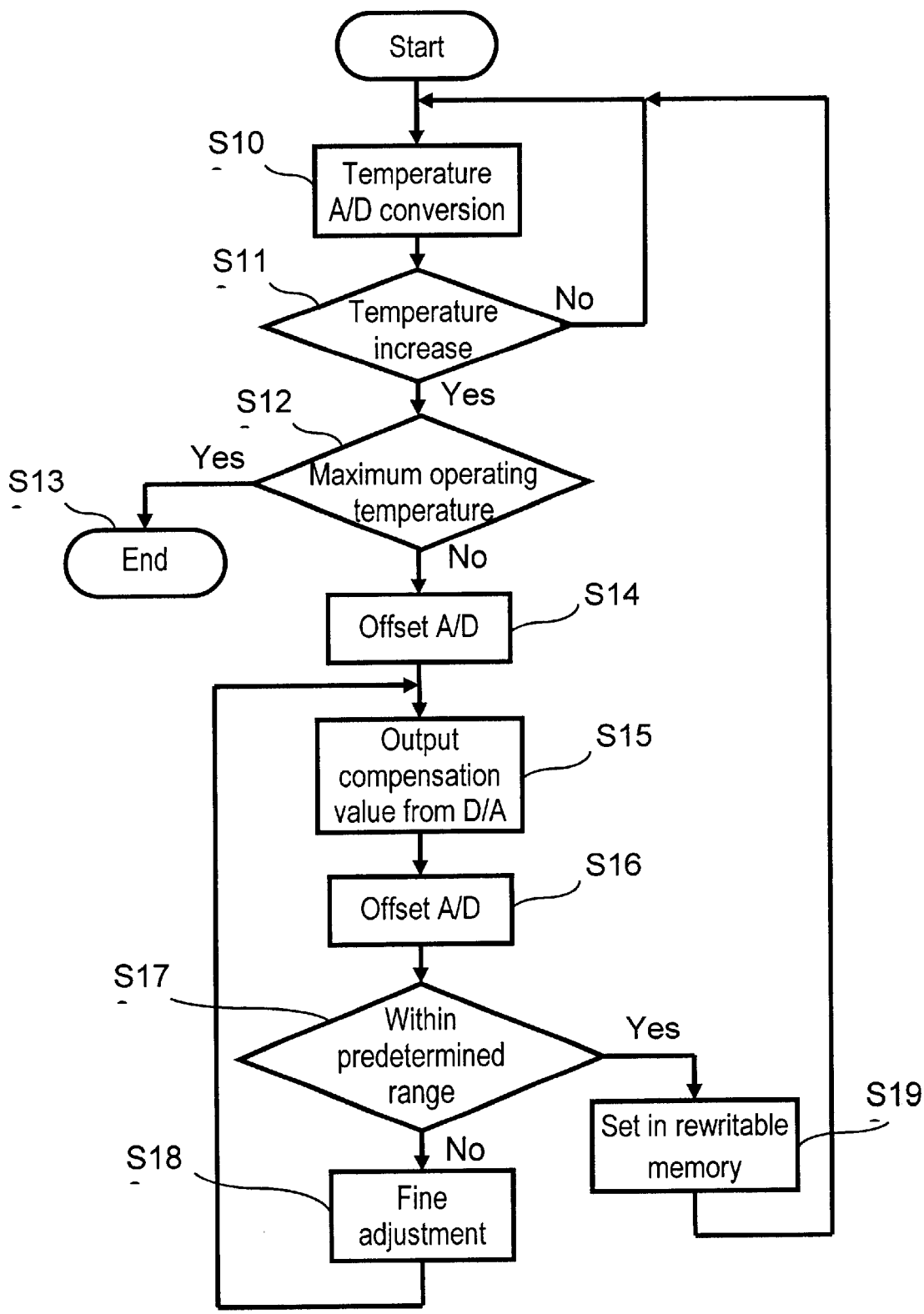
FIG. 7 is a flow chart of control procedures in a compensation setting mode of the automatic compensation sensor in accordance with the fifth exemplary embodiment of the present invention.
Figure 8:
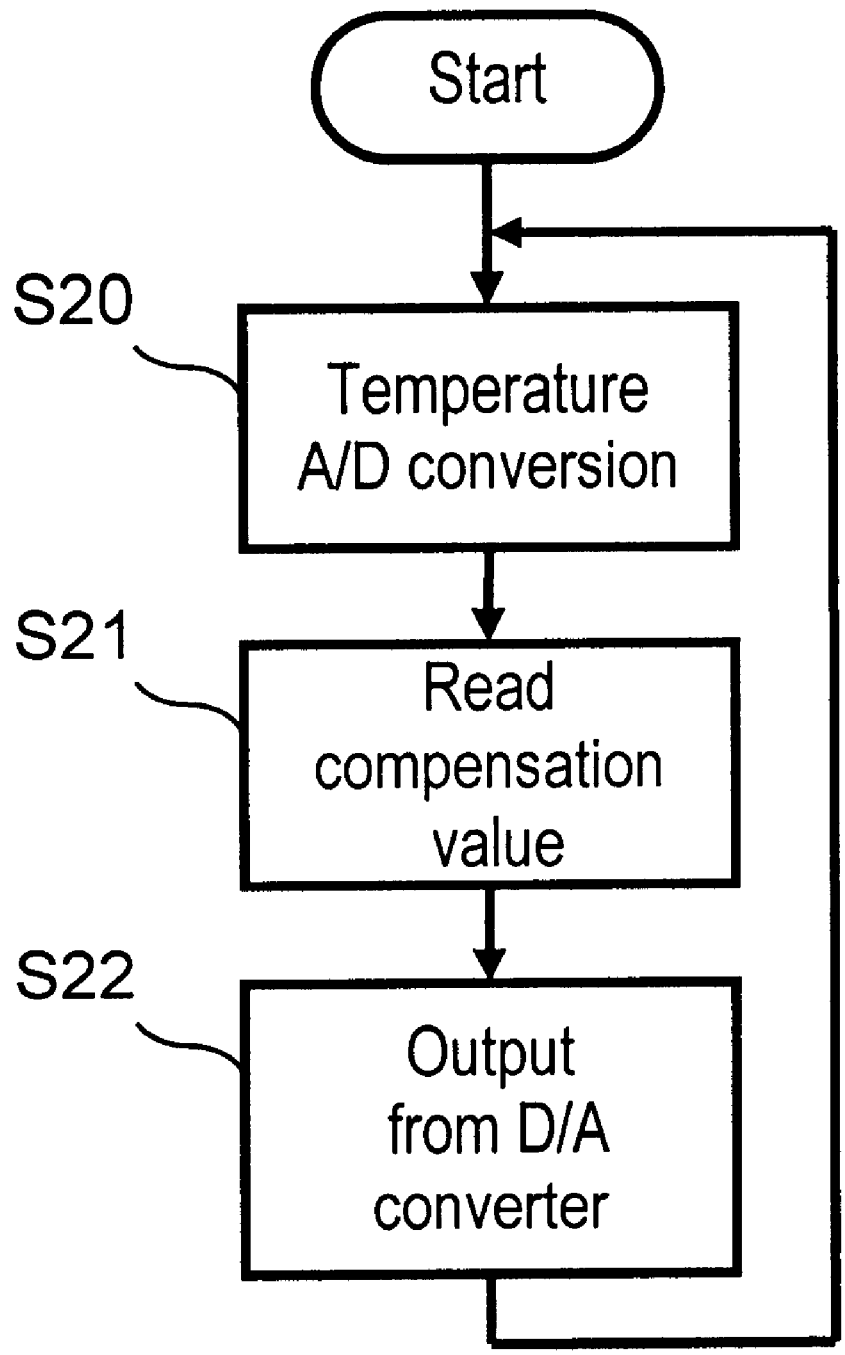
FIG. 8 is a flow chart of control procedures in a normal operation mode of the automatic compensation sensor in accordance with the fifth exemplary embodiment of the present invention.

A fifth exemplary embodiment of the present invention is explained with reference to FIGS. 6 to 8. FIG. 6 shows an automatic compensation sensor in the fifth exemplary embodiment of the present invention. In FIG. 6, reference numeral 30 is a sensor body which comprises a sensing unit 31, signal output stage 32, and adder 33. The adder 33 is inserted between the sensing unit 31 and the signal output stage 32 so that intrinsic sensor signals can be adjusted by inputting the compensation signal. Reference numeral 40 is a microcomputer which acts as a controller. The microcomputer 40 has the additional functions of an A/D converter 41, D/A converter 42, and rewritable memory 43. These additional functions are built into the microcomputer 40 or externally attached as peripherals. If they are externally attached, the microcomputer 40 includes such externally attached units. The output of the D/A converter 42 of the microcomputer 40 is connected to the adder 33 of the sensor body 30. Reference numeral 50 is a temperature sensor, which is connected to the A/D converter 41 of the microcomputer 40. Reference numeral 60 is a compensation value input terminal, which is connected to the A/D converter 41 of the microcomputer 40.

Operation of the above automatic compensation sensor is described next. The sensor body 30 executes intrinsic operations of the sensor regardless of the operations of other components. However, the output of the sensor body 30 is adjusted externally by the adder 33.

The microcomputer 40 has two main modes of operation. One is the compensation value setting mode and the other is the normal operation mode. If no compensation value is set, the microcomputer 40 operates in the compensation value setting mode, and if the compensation value is set, it operates in the normal operation mode.

First, the compensation value setting mode is explained. To set the compensation value, the automatic compensation sensor is attached to a temperature controllable device such as a constant temperature chamber (hereafter referred to as the constant temperature chamber). The error signal between the sensor output and sensor output reference value is input to the compensation value input terminal 60. When executing the compensation value setting mode, the constant temperature chamber controls the temperature and traces all the operating temperatures of the automatic compensation sensor.

Here, let's say that temperature is controlled from a minimum operating temperature Tl to a maximum operating temperature Th. FIG. 7 is a flow chart illustrating control procedures of the microcomputer 40. A temperature resolution for setting the compensation value is also determined. The compensation value is set for every temperature determined based on this temperature resolution.

The microcomputer 40 sets the input of the A/D converter 41 to the temperature sensor 50, and temperature information is converted from analog to digital in step S10. Since the temperature is controlled to increase from the minimum operating temperature, the temperature increase from the current temperature to the next compensated temperature is continuously detected in step S11. After detecting the temperature increase, the microcomputer 40 checks whether the temperature is the maximum operating temperature in step S12. If the temperature exceeds the maximum operating temperature, the compensation value setting mode is completed in step S13. If it does not exceed the maximum operating temperature, the A/D input terminal is set to the compensation value input terminal 60 in step S14 to execute analog to digital conversion. This value indicates the offset error of the sensor output. Based on this A/D converted value, the compensation value is output from the D/A converter 42 in step S15. In steps S16, S17, and S18, this value is input to the adder 33 of the sensor body 30 to adjust the sensor output. The microcomputer 40 executes A/D conversion of the signal from the compensation value input terminal 60 again, and then in step S17, it is checked whether this value is within predetermined compensation error. Normally, the predetermined range is set within approximately ±1 A/D conversion bits. If this value is within the predetermined range, the value is set to the rewritable memory 43 as the compensation value for that temperature, and then the temperature increase is again detected. If the value is not within the predetermined range, the compensation value is finely adjusted in step S18 until the value falls within the predetermined range.

Next, the normal operation mode is explained with reference to the flow chart illustrated in FIG. 8. The microcomputer 40 sets the input of the A/D converter 41 to the temperature sensor 50, and in step S20, A/D conversion of the temperature is executed. Next, in step S21, the compensation value for this temperature is read out from the rewritable memory 43. In step S22, this value is output from the D/A converter 42. This value is then input to the adder 33 of the sensor body 30 to compensate the sensor output. The above operation is repeated.

With the above configuration, the offset for each temperature can be reduced, resulting in effectively enabling prevention of temperature offset drift, even if the sensor shows complicated characteristics as a temperature function. Suppose that if there is no temperature hysteresis in the temperature characteristics of the output of the sensor body 30 and the temperature sensor 50, the temperature resolution for setting the compensation value needs to be sufficiently precise to counteract any offset temperature changes caused by the sensor body 30. Compensation error at this point depends on the compensation resolution of the sensor which is determined by the resolution of the D/A converter 42 of the microcomputer 40. For example, if a change in the sensor output is X mV when one bit of the D/A converter 42 changes, and the accuracy of the D/A converter 42 is ±1 bit, the maximum compensation error will be ±X mV.

It will be possible to operate the compensation value setting mode again, even when the compensation value is already set, by providing the compensation instruction input terminal to the microcomputer 40 for starting the compensation value setting mode.

Furthermore, if greater accuracy of compensation value is required, it is preferable to use the next method in the compensation value setting mode. In general, in the relation between the temperature and sensor output, temperature hysteresis unique to the sensor body 30 and difference in temperature change between the attachment position of the temperature sensor 50 and the sensor body 30 produces temperature hysteresis. This hysteresis causes compensation errors during temperature rise and decrease. If the compensation value is set by changing from low temperature to high temperature as described above, compensation error becomes greater when temperature decreases in the normal operation mode.

Accordingly, the temperature is changed between the minimum and maximum operating temperature once or more to determine the compensation value for a certain temperature based on the mean value between values at the temperature rise and temperature decrease. This enables reduction of the maximum value in the compensation error in the normal operation mode.

Sixth Exemplary Embodiment

Figure 9:
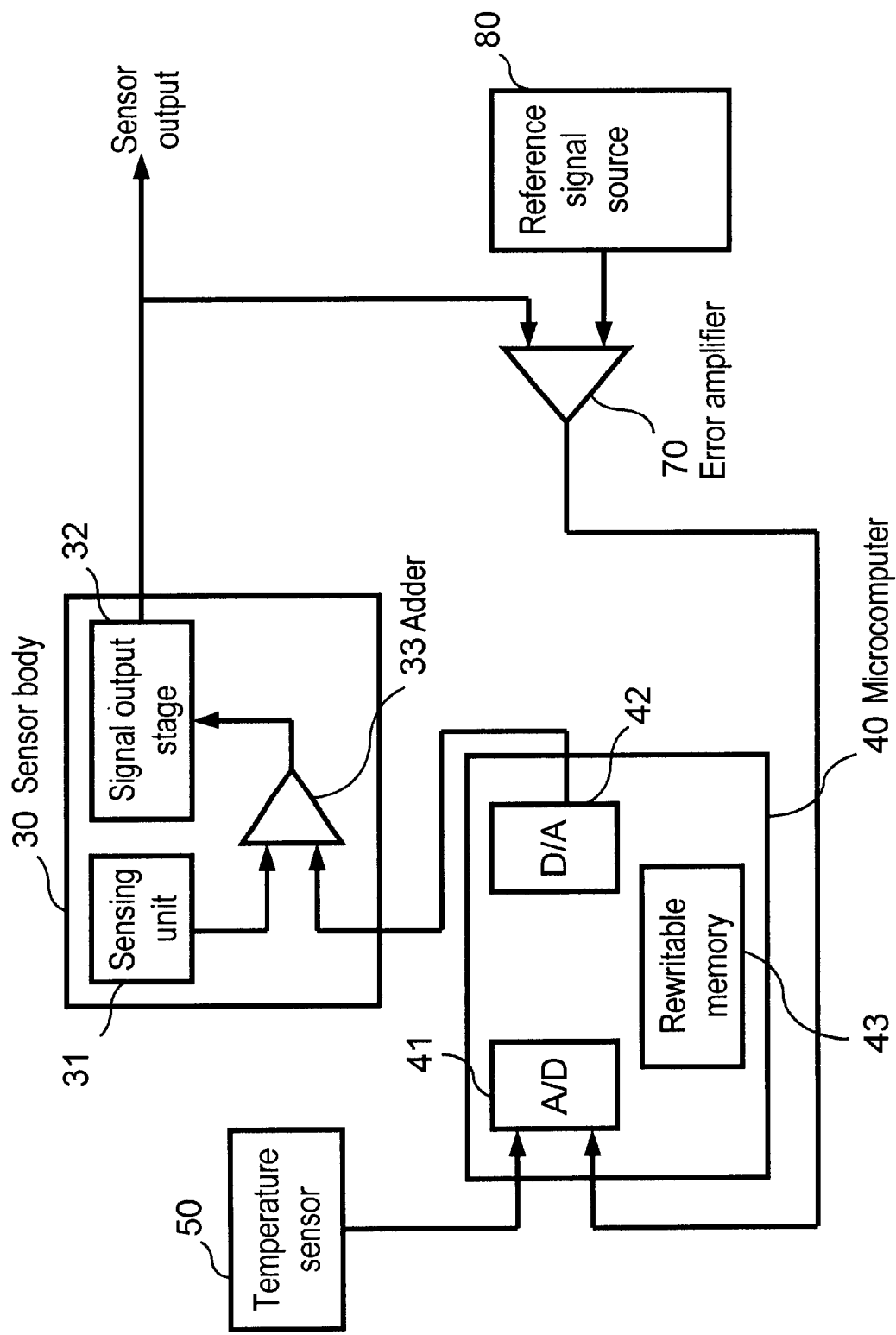
FIG. 9 is a block diagram of an automatic compensation sensor in accordance with a sixth exemplary embodiment of the present invention.

FIG. 9 shows a sixth exemplary embodiment of an automatic compensation sensor of the present invention. In FIG. 9, the configuration of the automatic compensation sensor is basically the same as that of the fifth exemplary embodiment in FIG. 6. The same reference numerals are given to the same parts, thus omitting a detailed explanation.

In FIG. 9, reference numeral 70 is an error amplifier, to which the sensor output and the output of a power supply for reference output 80, described later, are input, and the output of the error amplifier 70 is connected to the input terminal of the A/D converter 41 of the microcomputer 40.

Operation of the above automatic compensation sensor is explained next. It is basically the same as that in the fifth exemplary embodiment, and thus only the different parts are explained below.

The sensor body 30 only executes its intrinsic operations. The microcomputer 40 has a compensation value setting mode and normal operation mode, and operates in the same way as that in the fifth exemplary embodiment. However, the part which executes A/D conversion of the value of the compensation value input terminal 60 in the compensation value setting mode of the fifth exemplary embodiment is replaced with A/D conversion of the output of the error amplifier 70. The output from the error amplifier 70 is the same as the input from the compensation value input terminal 60 in the fifth exemplary embodiment.

The reference value output power supply 80 always outputs the center value of the sensor offset, and this value may be required to be sufficiently stable with regard to temperature and secular changes in comparison to that of the sensor.

With the above configuration, the automatic compensation sensor in this exemplary embodiment achieves the same effect as that in the fifth exemplary embodiment, and also has the following effect. There is no need to externally input an error signal between the sensor output and reference value of the sensor output during the setting of the compensation value. This is a significant advantage with respect to equipment used in a manufacturing process.

However, it is necessary to sufficiently reduce the temperature and secular output changes of the reference value output power supply 80 and error amplifier 70, compared to the resolution of the A/D converter 41 of the microcomputer 40.

The control procedures of the microcomputer 40 allow the sensor output to be monitored by executing A/D conversion of the output of the error amplifier 70 while in the normal operation mode. This feature can be used in diagnosis of failures.

Seventh Exemplary Embodiment

Figure 10:
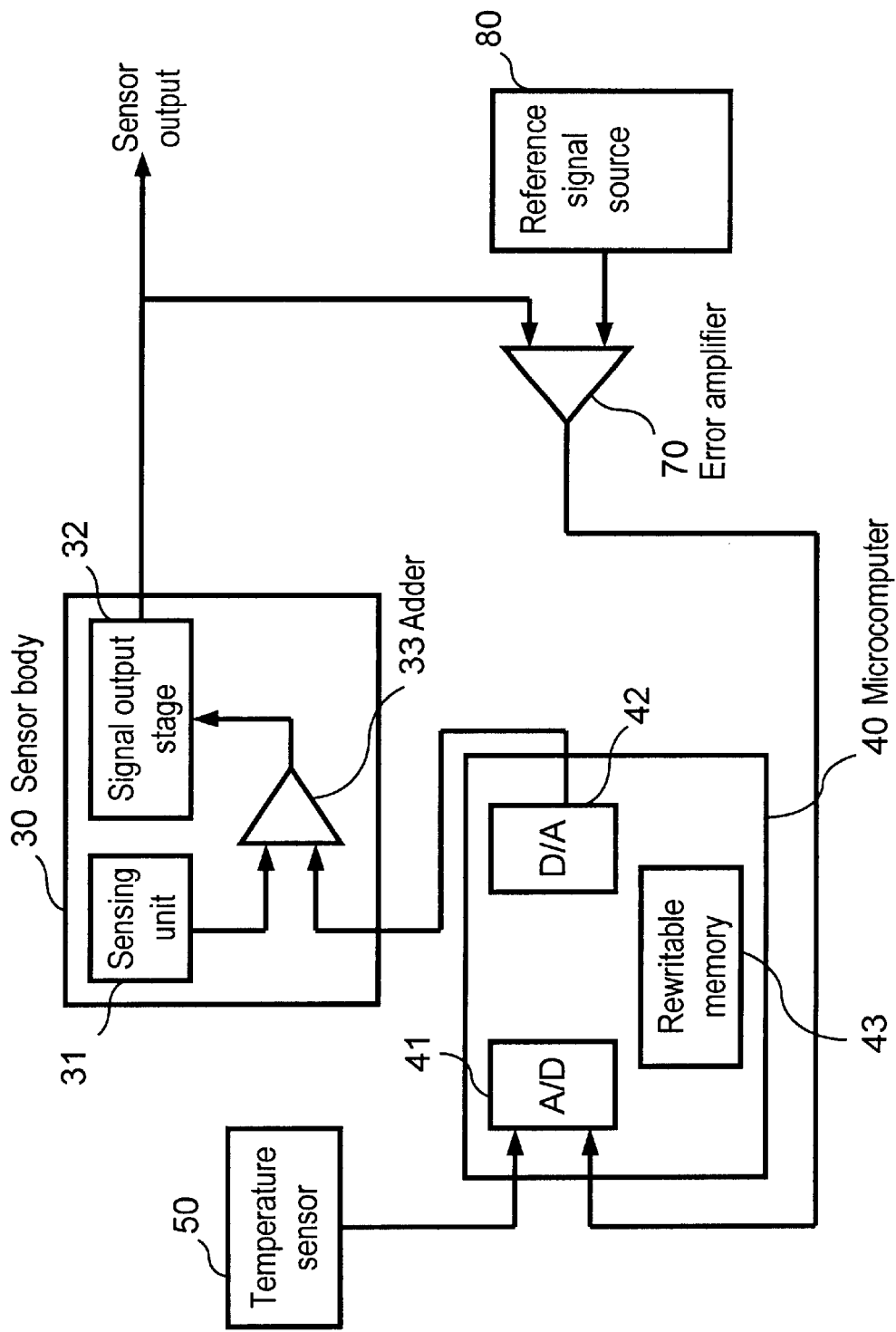
FIG. 10 is a block diagram of an automatic compensation sensor in accordance with a seventh exemplary embodiment of the present invention.

FIG. 10 shows an automatic compensation sensor in a seventh exemplary embodiment of the present invention. The configuration of the automatic compensation sensor shown in FIG. 10 is identical to that of the sixth exemplary embodiment shown in FIG. 9. Only the control procedures of the microcomputer 40 are different. Explanation of other configurations is thus omitted here.

Figure 11:
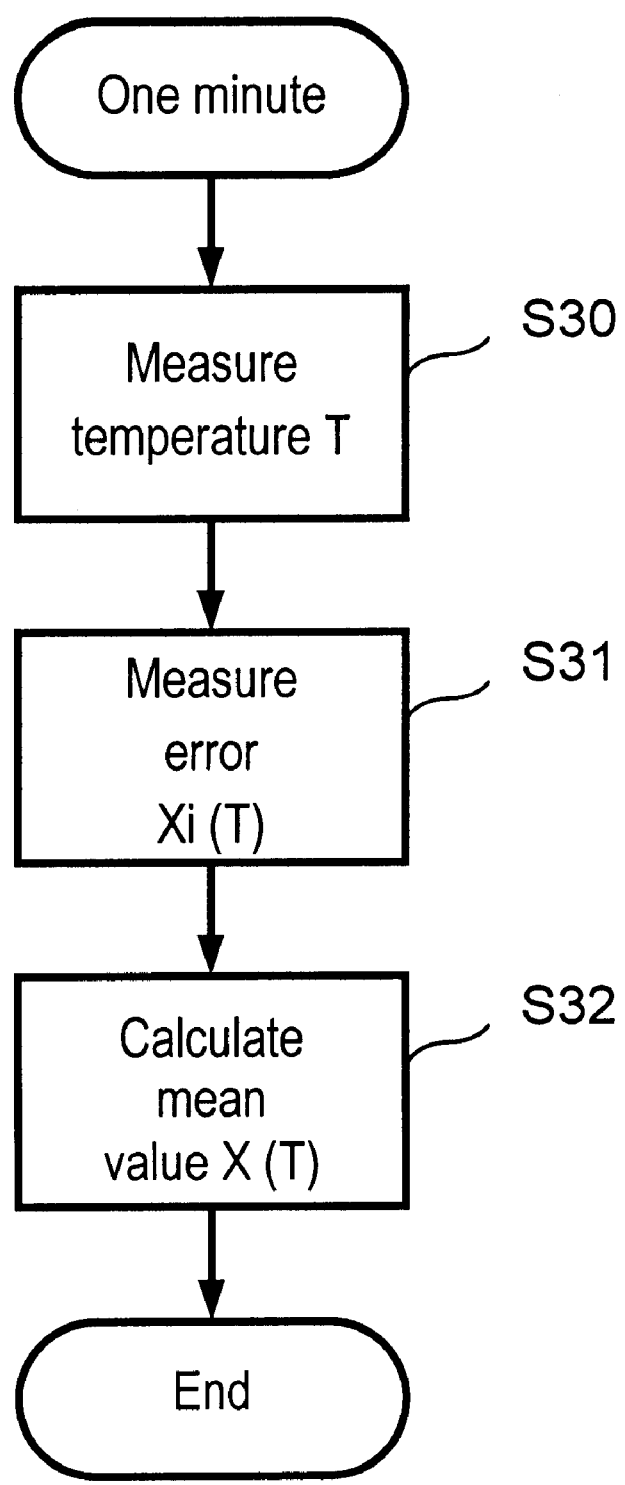
FIG. 11 is a flow chart for calculating a mean offset error of the automatic compensation sensor in accordance with the seventh exemplary embodiment of the present invention.

The operation of the automatic compensation sensor in the seventh exemplary embodiment is explained next- As described in the sixth exemplary embodiment, the automatic compensation sensor operates in both the compensation value setting mode and normal operation mode. In the compensation value setting mode, the offset drift of the sensor by temperature is compensated by employing the same procedures as described in the compensation value setting mode of the sixth exemplary embodiment. Explanation is thus omitted here. Next, operation in the normal operation mode is explained with reference to flow charts shown in FIGS. 11 and 12.

In the normal operation mode, the automatic compensation sensor is considered to be built into some kind of system for operation. The microcomputer 40 operates according to the flow chart shown in FIG. 8, which is the same as in the sixth exemplary embodiment. In addition, the microcomputer 40 operates according to the flow chart shown in FIG. 11. This is executed in a relatively short cycle. Although the cycle depends on the characteristics of the sensor and the usage conditions of the system that the sensor is built into, a one-minute cycle is considered appropriate. In the following explanation, the cycle is set to one minute.

The microcomputer 40 first switches the input of the A/D converter 41 to the temperature sensor 50. In step S30, the temperature T at that time is measured. "T" is the value for every compensation value setting temperature determined by temperature resolution used in the compensation value setting mode. Next, the input of the A/D converter 41 is switched to the error amplifier 70. In step S31, the error Xi (T) from the sensor reference value is measured. This value includes secular drift of the sensor offset and the normal output of displacement detected by the sensor. In general, the sensor operates without displacement, and thus a state where a displacement is generated is considered very rare time-wise. Accordingly, this value is periodically measured and the mean value of numerous values is calculated to counteract the normal displacement output so that only the secular offset remains. In step S32, the following processing is executed.

From the sensor reference value at every temperature T, there is a mean value X (T) of the error Xi (T). This error Xi (T) is added to the mean value every time it is measured. For example, the following formula is for updating the mean value X (T):

$$X(T) = (N-1) \times Xi(T)/N + Xi(T)/N$$

Here, N is the number of pieces of data used for taking the average, which must be sufficiently numerous.

The initial value of the mean value X (T) at the time the automatic compensation sensor is incorporated into the system is set as the sensor reference value.

Figure 12:
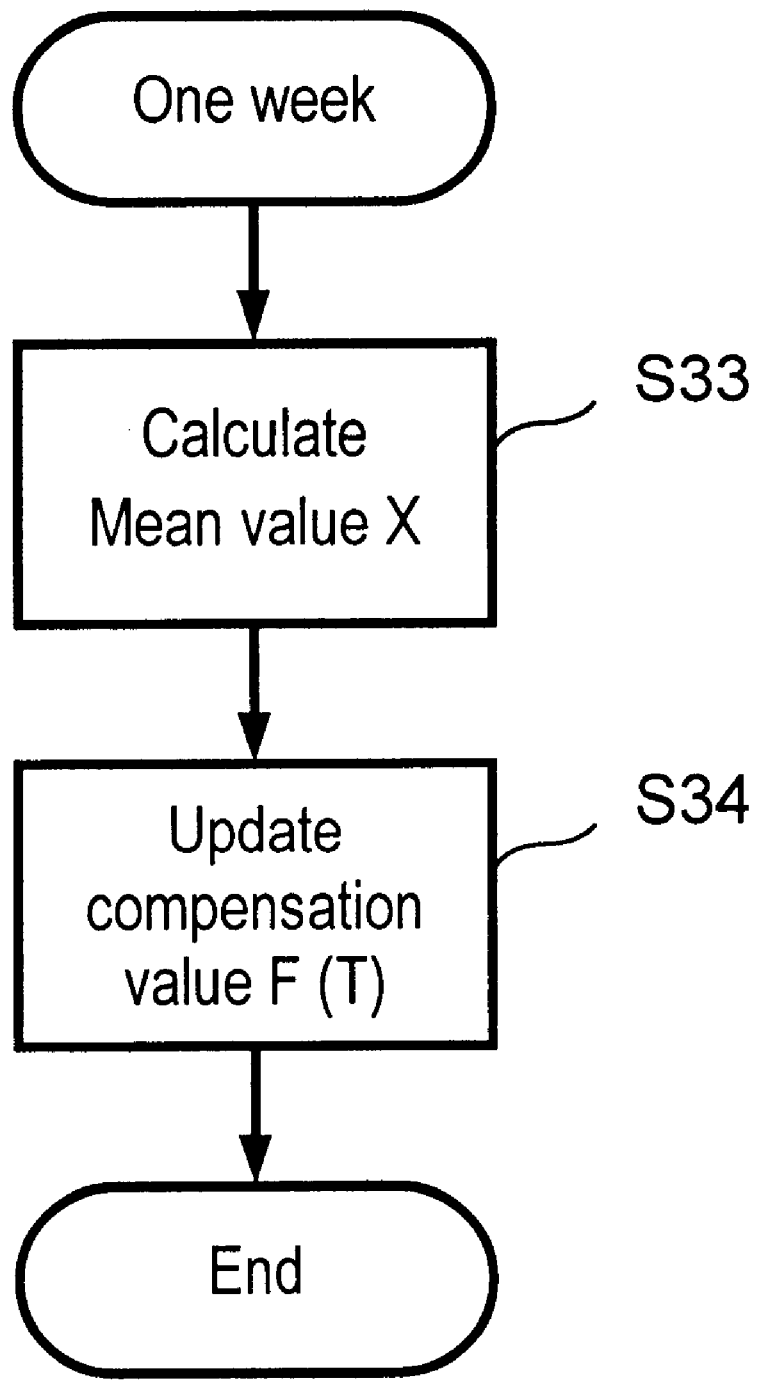
FIG. 12 is a flow chart for updating a compensation value of the automatic compensation sensor in accordance with the seventh exemplary embodiment of the present invention.

Next, the operation for updating the compensation value, when the microcomputer 40 evaluates secular changes in the offset drift, is explained with reference to the flow chart shown in FIG. 12.

Updating the compensation value needs to take sufficiently longer time than updating a mean value. Although the update interval may vary depending on the size of the sensor offset drift and the displacement detection frequency of the system, a one-week cycle is generally considered appropriate. In the following explanation, the interval is set to one week.

The microcomputer 40 calculates a mean value of all temperatures with regard to a mean value X (T) of error from a sensor reference value at each temperature T. More specifically, it can be shown using the following formula:

$$X = \Sigma X(T)/M$$

Whereas M is the number of compensation value setting temperatures T.

Then, in step S34, the above error mean value X (T) is added to a compensation value F (T) at each temperature for all temperatures to create a new compensation value.

$$F(T) \leftarrow F(T) + X$$

In the remaining processes, this new value is used as the output of the compensation value.

The above configuration enables temperature and secular offset drift of the sensor to be reduced. With respect to secular offset drift, the configuration of this exemplary embodiment is particularly effective when the characteristics unique to the sensor tend to shift with voltage changes.

Eighth Exemplary Embodiment

Figure 13:
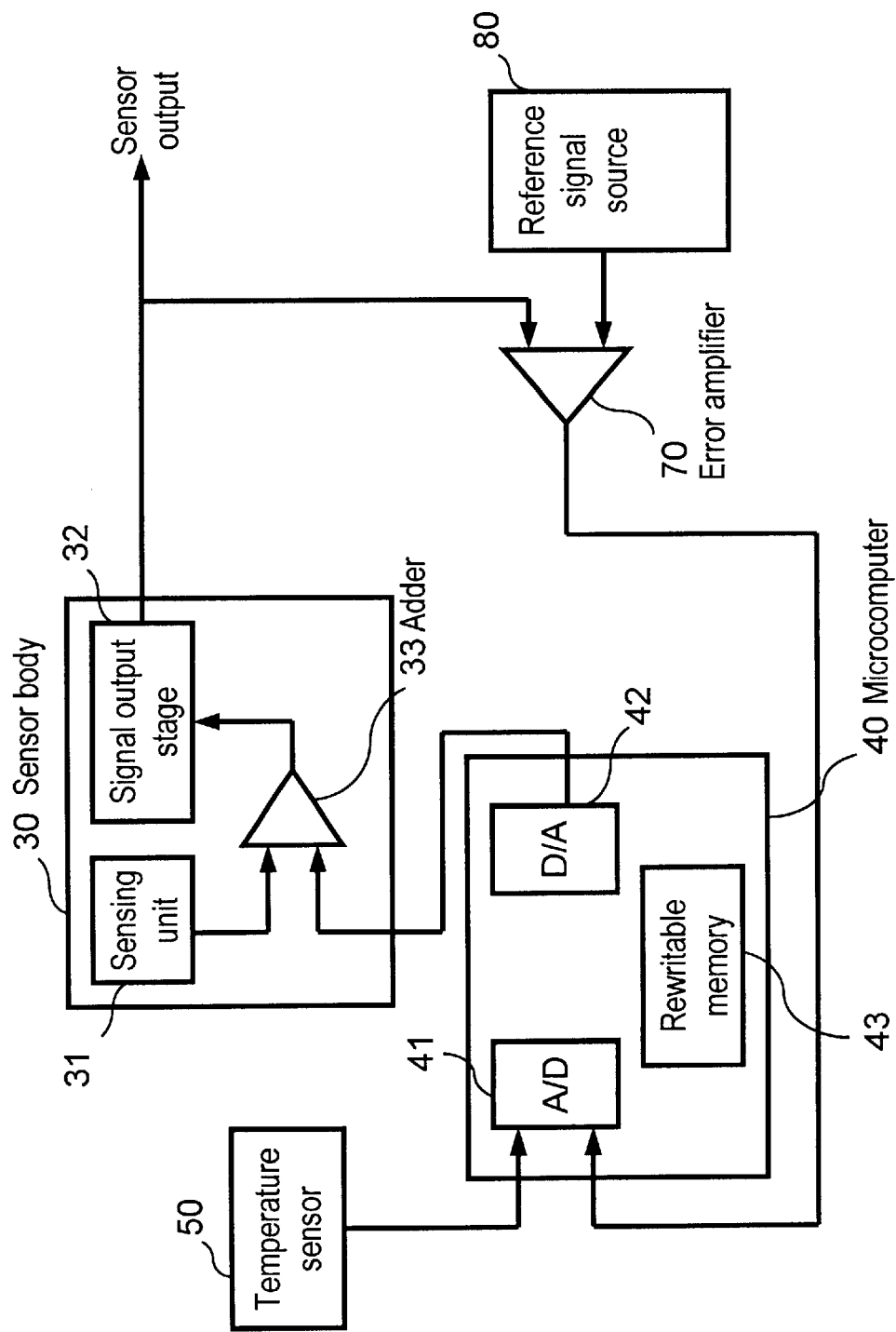
FIG. 13 is a block diagram of an automatic compensation sensor in accordance with an eighth exemplary embodiment of the present invention.

FIG. 13 shows an automatic compensation sensor in an eighth exemplary embodiment of the present invention. In FIG. 13, the configuration of the automatic compensation sensor is identical to that of the sixth exemplary embodiment shown in FIG. 9. Only the control procedures of the microcomputer 40 are different. Explanation of other configurations is thus omitted here.

The operation of this automatic compensation sensor is explained next. As described in the sixth exemplary embodiment, the automatic compensation sensor operates in the compensation value setting mode and normal operation mode. In the compensation value setting mode, the offset drift of the sensor by temperature is compensated by employing the same operation as described in the compensation value setting mode of the sixth exemplary embodiment. Explanation is thus omitted here. Next, operation in the normal operation mode is explained with reference to a flow chart shown in FIG. 14.

In the normal operation mode, the automatic compensation sensor is considered to be built into some kind of system for operation. The microcomputer 40 operates according to the flow chart shown in FIG. 8, which is the same as in the sixth exemplary embodiment. In addition, the microcomputer 40 operates according to the flow chart shown in FIG. 11, which is the same as in the seventh exemplary embodiment.

Figure 14:
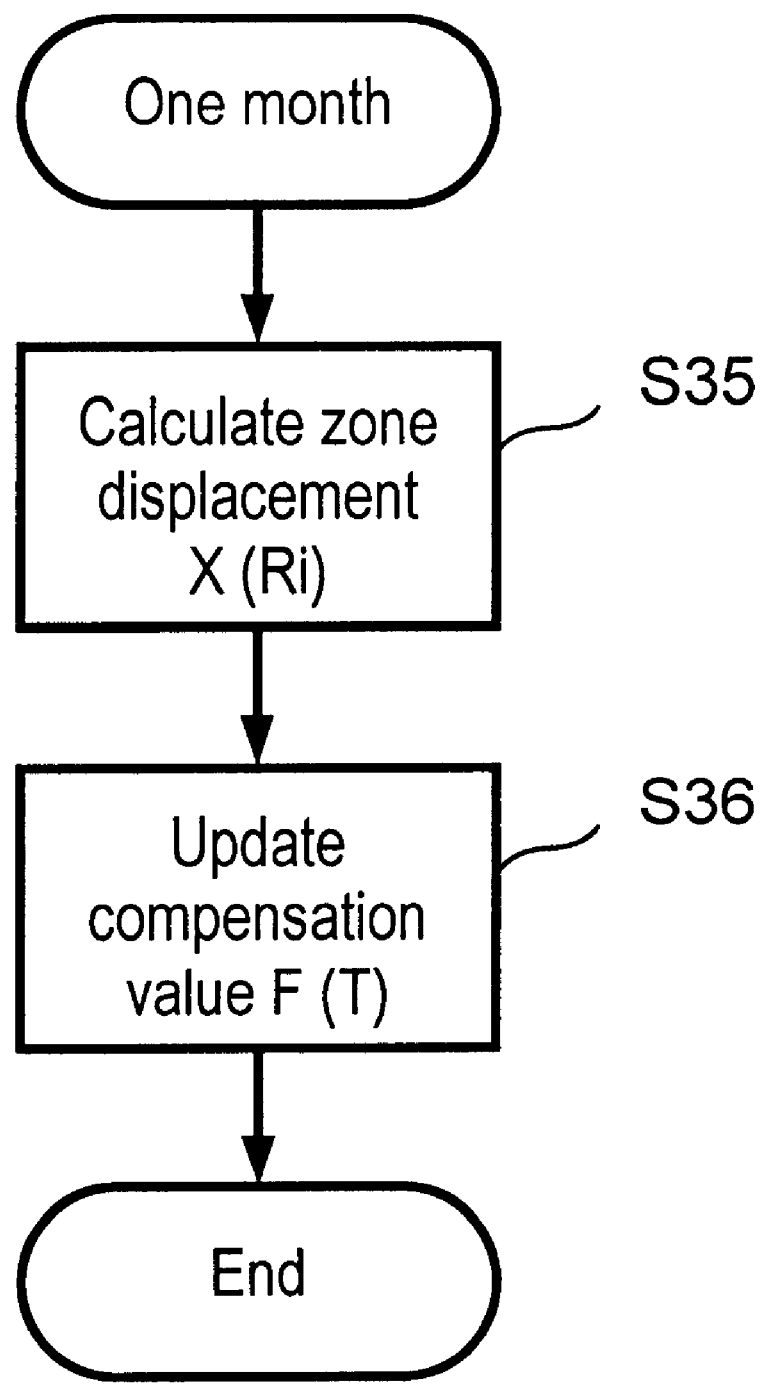
FIG. 14 is a flow chart for updating of a compensation value of the automatic compensation sensor in accordance with the eighth exemplary embodiment of the present invention.

Next, the operation of the microcomputer 40 for updating a compensation value taking into account secular changes of the offset drift is explained with reference to a flow chart shown in FIG. 14.

Updating the compensation value needs to take sufficiently longer time than updating a mean value. It is further necessary to be set longer than that in the sixth exemplary embodiment. Although the update interval may vary depending on the size of the sensor offset drift and displacement detection frequency of the system, one-month interval is generally appropriate. In the following explanation, the interval is set to one month.

The microcomputer 40, in step S35, is provided with several temperature zones between the minimum operating temperature and maximum operating temperature, and each temperature zone is called Ri. For all temperatures T included in each temperature zone Ri, zone displacement (Ri) is calculated based on a mean X (T) of error against the reference value of the sensor output at each temperature. More specifically:

$$X(Ri) = \Sigma X(T)$$

Whereas, T is included in Ri.

The above calculation is implemented for all zones Ri. Then, in step S36, each compensation value is updated. Here, zone displacement is smoothed while each compensation value is updated. Zone smoothing is applied to eliminate a gap in compensation amount between a zone Ri and a zone Ri+1. For example, next method can be applied.

First, the lowest temperature zone R0 and the next zone R1 are compared. If they are different, zone displacement X (R0) in the zone R0 and a value in the zone X (R1) are used for the M0 number of compensation value included in the zone R0. In the zone R0, a value consistent with the zone displacement X (R0) for the lowest temperature, and the zone displacement X (R1) for the highest temperature are added to update a compensation value F (T) at each temperature T included in the zone R0. More specifically:

$$F(T) \leftarrow F(T) + X(R0) + (X(R0) - X(R1))[T - TR0]/M$$

Whereas TR0 is a starting temperature in the zone R0.

In the same way, the same calculation as the above is executed sequentially for all zones Ri.

With the above configuration, temperature and secular offset drift of the sensor can be reduced. With respect to secular offset drift, the configuration of this exemplary embodiment is particularly effective when there is no constant trend in characteristics unique to the sensor, which may be difficult to improve accuracy of the offset compensation using the configuration of the sixth exemplary embodiment. However, compared to the configuration of the sixth exemplary embodiment, compensation value update cycle may need to be set sufficiently longer. Thus compensation accuracy may degrade in temperature zones which are not frequently used.

Ninth Exemplary Embodiment

Figure 15:
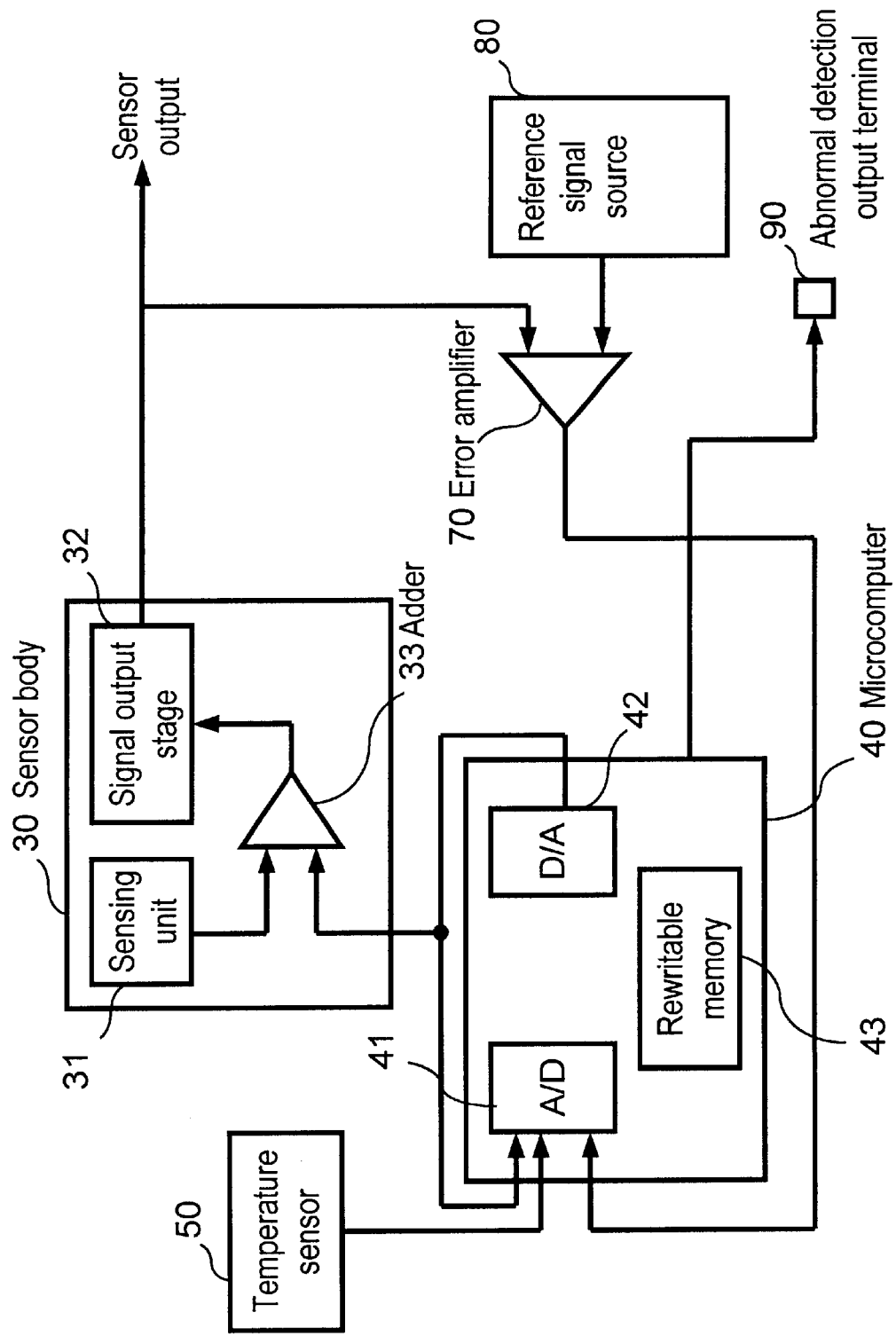
FIG. 15 is a block diagram of an automatic compensation sensor in accordance with a ninth exemplary embodiment of the present invention.

FIG. 15 shows an automatic compensation sensor in a ninth exemplary embodiment. In FIG. 15, the basic configuration of this exemplary embodiment is the same as that in the fifth exemplary embodiment shown in FIG. 7. The same reference numerals are given to same components, and thus omitting the need for a detailed explanation.

In FIG. 15, reference numeral 90 is an abnormal value detection output terminal, which is connected to the microcomputer 40. The output of the D/A converter 42 connected to the adder 33 is also connected to the A/D converter 41.

The operation of the above automatic compensation sensor is explained next. This is basically the same as that in the sixth exemplary embodiment. Only the parts which are different are explained in details.

The sensor body 30 only executes its intrinsic operations. The microcomputer 40 has the compensation value setting mode and normal operation mode. These modes operate in the same way as in the sixth exemplary embodiment. However, at executing the following operation, abnormality is judged as shown in a flow chart in FIG. 16.

Figure 16C:
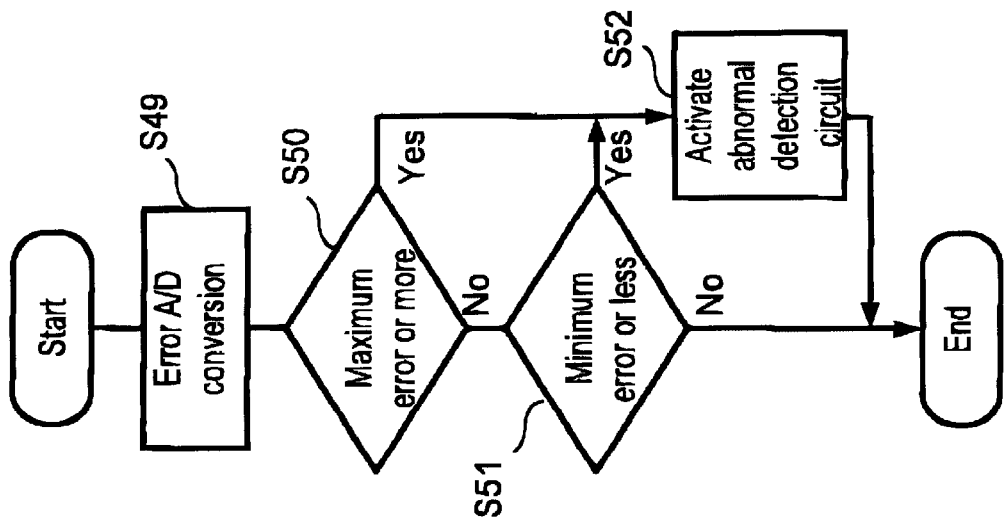
FIG. 16 is a flow chart for detecting abnormality of the automatic compensation sensor in accordance with the ninth exemplary embodiment of the present invention.
Figure 16B:
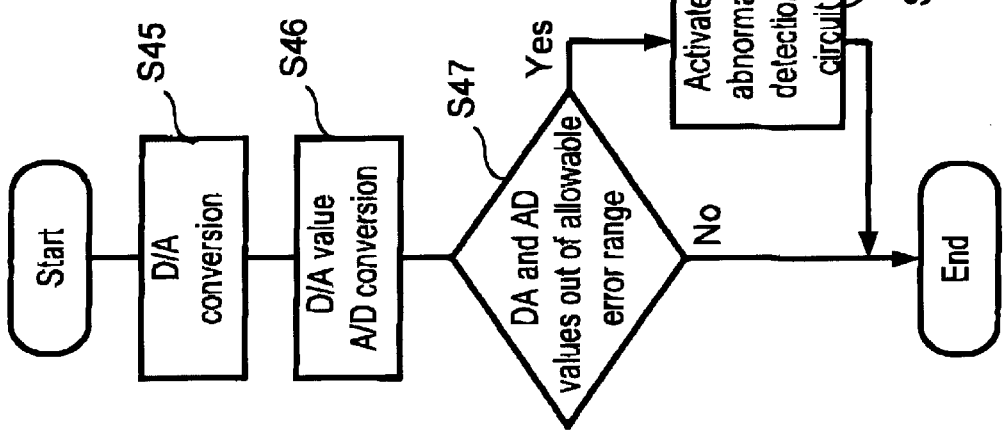
Figure 16A:
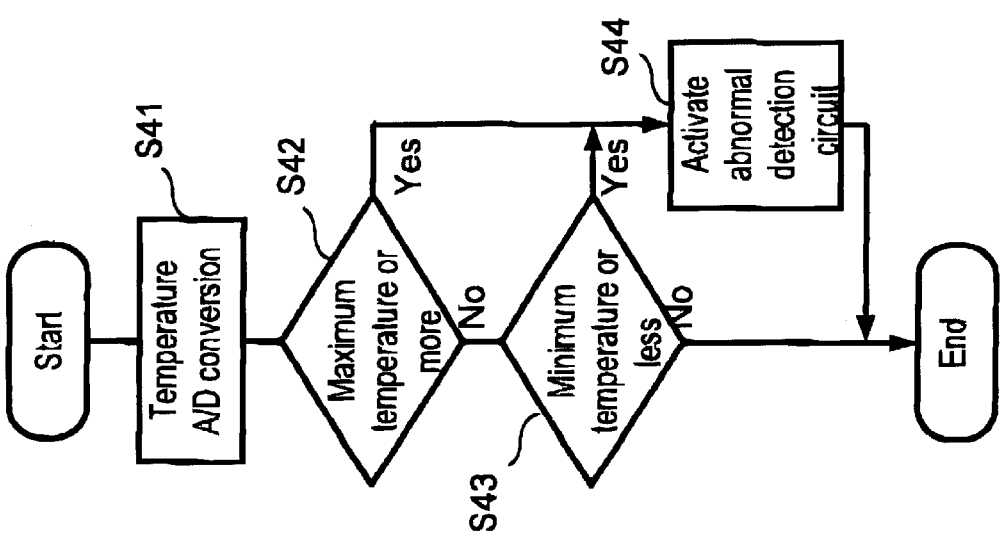
Figure 17:
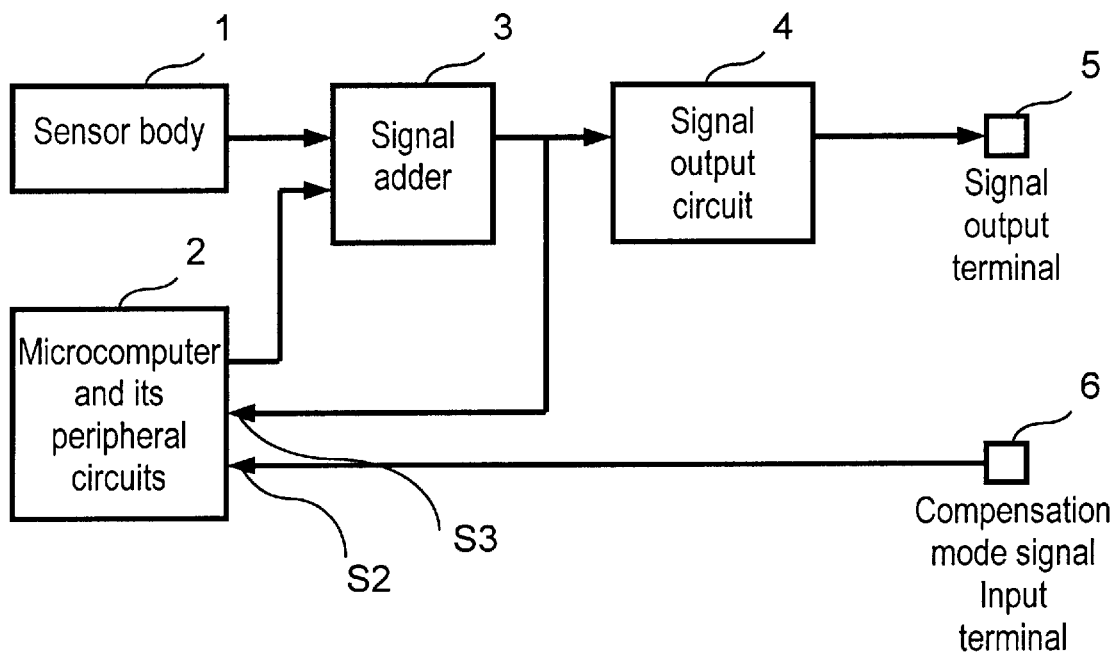
FIG. 17 is a block diagram of an automatic compensation sensor of the prior art.

More specifically, as shown in FIG. 16A, the output of the temperature sensor 50 is converted from analog to digital in step S41. At reading the output of the temperature sensor 50, in steps S42 and S43, whether the output is the maximum temperature value or the minimum temperature value is checked. If the A/D converter 41 detects voltage generated from other than the temperature sensor 50, it is considered abnormal. In this case, in step S44, the abnormal detection output terminal 90 is activated.

In step S45 shown in FIG. 16B, D/A conversion is executed, and the output of the D/A converter 42 is read by the A/D converter 41. In step S46, A/D conversion is executed. In step S47, matching of DA value and AD value is checked. If the value is out of the allowable error range, it is judged abnormal, making the abnormal value detection output terminal 90 activated in step S48.

Next, as shown in FIG. 16C, the output of the error amplifier 70 is converted from analog to digital in step S49. At reading the sensor output in steps S50 and S51, whether the output is above the maximum error value or below a minimum error value is checked. If a value out of the sensor output range is detected, it is considered abnormal. In step S52, the abnormal value detection output terminal 90 is activated.

With the above configuration, abnormality occurred in the automatic compensation sensor can be informed to the outside, thus improving the reliability.

As explained in the fifth to ninth exemplary embodiments, the microcomputer used as a controller has a function to compensate for the sensor output. This enables the reduction of offset drift against temperature and secular changes even for a sensor which intrinsically has large offset drift and shows complicated temperature and secular changes.

INDUSTRIAL APPLICABILITY

As described above, the present invention has a control means for compensating the output signal from the signal output terminal. This enables the elimination of the exclusive input terminal normally required for the compensation mode signal.

What is claimed is:

1. An automatic compensation sensor comprising:

a signal output terminal for outputting a compensated sensor signal in a normal mode and for receiving an external signal in a compensation mode;

a sensing unit for outputting a sensor signal;

compensation value means for determining and outputting a compensation value in the normal mode and for setting the compensation value in the compensation mode based on the external signal; and an adder for summing the sensor signal and the compensation value and for producing the compensated sensor signal.

2. The automatic compensation sensor of claim 1, wherein the compensation value means receives the compensated sensor signal in the compensation mode and sets the compensation value based on the compensated sensor signal and the external signal.

3. The automatic compensation sensor of claim 1, further comprising:

a diagnosis circuit responsive to the sensing unit and to the compensation value means for outputting a diagnosis signal, wherein the compensation value means receives the compensation signal.

4. An automatic compensation sensor comprising:

a sensing unit for outputting a sensor signal;

an Alternating Current (AC) component separator for outputting an AC component signal;

compensation value means for determining and outputting a compensation value in a normal mode and for setting the compensation value in a compensation mode based on the AC component signal; and an adder for summing the sensor signal and the compensation value and for producing the compensated sensor signal.

5. An automatic compensation sensor comprising:

a sensor body having an analog input for receiving an analog signal, the sensor body including:

a sensing unit for producing a first sensor signal, an adder for summing the analog signal with the first sensor signal and for producing a compensated sensor signal, and a signal output stage for adjusting and outputting the compensated sensor signal;

a sensor for producing a second sensor signal;

an error amplifier for generating an error signal based on the compensated sensor signal and a predetermined reference value; and compensation value means, having a memory for storing a plurality of compensation values, for generating the analog signal based on at least one of the plurality of compensation values, the second sensor signal, and the error signal.

6. The automatic compensation sensor of claim 5, wherein the sensor is a temperature sensor.

7. The automatic compensation sensor of claim 6, wherein the compensation value means calculates a mean value of a plurality of error signal measurements for each of a plurality of temperatures, and wherein the compensation value means updates each of the plurality of compensation values based on the mean value.

8. The automatic compensation sensor of claim 6, wherein the compensation value means calculates a plurality of mean values each associated with a plurality of error signal measurements taken in one of a plurality of temperature zones, and wherein the compensation value means updates each of the plurality of compensation values based on the mean value.

9. The automatic compensation sensor of claim 5, wherein the compensation value means further includes an abnormal value detection output which is activated by the detection of an abnormality.

\* \* \* \* \*